(12) United States Patent
Simonyi (10) Patent No.: US 7,730,102 B2
(45) Date of Patent: *Jun. 1, 2010

(54) METHOD AND SYSTEM FOR ORGANIZING AND MANIPULATING NODES BY CATEGORY IN A PROGRAM TREE

(75) Inventor: Charles Simonyi, Medina, WA (US)

(73) Assignee: Intentional Software Corporation, Bellevue, WA (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/567,690

(22) Filed: Dec. 6, 2006

(65) Prior Publication Data

US 2007/0156722 A1  Jul. 5, 2007

Related U.S. Application Data

(63) Continuation of application No. 10/456,957, filed on Jun. 6, 2003, now Pat. No. 7,165,238.

(51) Int. Cl.
*G07F 17/30* (2006.01)

(52) U.S. Cl. .................. 707/797; 717/113; 717/144

(58) Field of Classification Search ................ 707/101; 717/113, 144
See application file for complete search history.

(56) References Cited

U.S. PATENT DOCUMENTS

| | | | |
|---|---|---|---|
| 5,493,678 A | 2/1996 | Arcuri et al. | |
| 5,748,975 A | 5/1998 | Van De Vanter | |
| 5,752,058 A | 5/1998 | Van De Vanter | |
| 5,768,564 A * | 6/1998 | Andrews et al. | 717/137 |
| 5,790,863 A * | 8/1998 | Simonyi | 717/113 |
| 5,813,019 A | 9/1998 | Van De Vanter | |
| 5,857,212 A | 1/1999 | Van De Vanter | |
| 5,991,756 A * | 11/1999 | Wu | 707/3 |
| 6,055,540 A * | 4/2000 | Snow et al. | 707/103 R |
| 6,078,746 A * | 6/2000 | Simonyi | 717/144 |

(Continued)

FOREIGN PATENT DOCUMENTS

JP  61282934  12/1986

(Continued)

OTHER PUBLICATIONS

Smosna, M., "Compiler Lecture Notes—Chapter 13: Semantic Analysis (Statement and Expression Processing)", Feb. 13, 1994, pp. 1-26, accessed online at <ftp://cs.nyu.edu/pub/courses/compilers/Notes/ch13.ps> on Jan. 8, 2009.*

(Continued)

*Primary Examiner*—Charles Rones
*Assistant Examiner*—Phuong-Thao Cao
(74) *Attorney, Agent, or Firm*—Perkins Coie LLP (57) ABSTRACT

A method and system for organizing nodes within a program tree. The system allows various child node categories to be defined for node types of a program tree. When a child node is added to a parent node, the system identifies the category of the child node. The system then instantiates a category data structure for the identified category. The system stores a reference to the instantiated category data structure in the parent node and stores a reference to the child node in the instantiated category data structure.

32 Claims, 10 Drawing Sheets

U.S. PATENT DOCUMENTS

| | | | |
|---|---|---|---|
| 6,085,029 A * | 7/2000 | Kolawa et al. | 714/38 |
| 6,097,888 A * | 8/2000 | Simonyi | 717/144 |
| 6,185,550 B1 * | 2/2001 | Snow et al. | 707/1 |
| 6,253,195 B1 * | 6/2001 | Hudis et al. | 707/2 |
| 6,269,475 B1 | 7/2001 | Farrell et al. | |
| 6,347,318 B1 * | 2/2002 | Rokicki | 707/100 |
| 6,745,384 B1 | 6/2004 | Biggerstaff | |
| 7,069,505 B2 * | 6/2006 | Tamano | 715/255 |
| 7,167,564 B2 * | 1/2007 | Asano et al. | 380/279 |
| 7,236,128 B2 * | 6/2007 | Sugar et al. | 342/465 |
| 2002/0004793 A1 * | 1/2002 | Keith, Jr. | 707/1 |
| 2002/0010713 A1 | 1/2002 | Egilsson | |
| 2002/0040363 A1 * | 4/2002 | Wolfman et al. | 707/5 |
| 2002/0087550 A1 * | 7/2002 | Carlyle et al. | 707/10 |
| 2002/0199034 A1 * | 12/2002 | Beckett et al. | 709/328 |
| 2004/0078356 A1 * | 4/2004 | Mazner et al. | 707/1 |

FOREIGN PATENT DOCUMENTS

| | | |
|---|---|---|
| JP | 02121030 | 5/1990 |
| JP | 03017741 | 1/1991 |
| JP | 05150970 | 6/1993 |
| JP | 05224904 | 9/1993 |
| JP | 07182147 | 7/1995 |
| JP | 07200587 | 8/1995 |
| JP | 08292880 | 11/1996 |
| JP | 2000020296 | 1/2000 |
| WO | WO-0198927 | 12/2001 |

OTHER PUBLICATIONS

The Java™ Tutorial, Simple Properties, Copyright 1995-2003 Sun Microsystems, Inc. (3 page) http://java.sun.com/docs/books/tutorial/javabeans/properties/properties.html [Accessed Oct. 3, 2003].

Explore the Tech Target Network, XSD, Copyright 2001-2003, TechTarget (3 pages) http://searchwebservices.techtarget.com/sDefinition/0,,sid26_gci831325,00.html [Accessed Oct. 3, 2003].

Plotkin, David, "Alice-The Personal Pascal—First Interpreted ST Pascal," ANTIC, vol. 6, No. 2, Jun. 1987 (6 pages) http://www.atarimagazines.com/v6n2/Alice.html.

Welcome to Squeak (1 page) http://www.squeak.org/ [Accessed Oct. 29, 2003].

Rational Rose XDE Developer, Extend your Development Experience (3 pages) http://www-3.ibm.com/software/awdtools/developer/rosexde/features [Accessed Oct. 29, 2003].

PCT International Preliminary Report on Patentability for International Application No. PCT/US2004/016193, date of mailing Mar. 5, 2009, 8 pages.

Yasuichi Aoki et al., "Feature on Learning XML While Creating It (Basic), Chapter III Let's Write XML Document," *Open Design*, vol. 6, No. 6, pp. 50-57, CQ Publishing Co., Ltd., Japan, Dec. 1, 1999.

Final Rejection for Japanese Application No. 2006-514936, Mail Date Sep. 15, 2009, 4 pages.

Supplementary European Search Report for European Application No. 04753084, date of mailing Aug. 17, 2009, 4 pages.

Pintelas, P. et al., "A Comparative Study of Five Language Independent Programming Environments," Journal of Systems & Software, vol. 14, No. 1, Jan. 1, 1991, 13 pages.

\* cited by examiner

METHOD AND SYSTEM FOR ORGANIZING AND MANIPULATING NODES BY CATEGORY IN A PROGRAM TREE

CROSS REFERENCE TO RELATED APPLICATION(S)

This is a continuation application of U.S. application Ser. No. 10/456,957, filed on Jun. 6, 2003 now U.S. Pat. No. 7,165,238.

TECHNICAL FIELD

The described technology relates generally to organizing and manipulating nodes within a program tree.

BACKGROUND

Computer programs are generally written in a high-level programming language (e.g., Java or C). Compilers are then used to translate the instructions of the high-level programming language into machine instructions, which can be executed by a computer. The compilation process is generally divided into 6 phases:

1. Lexical analysis
2. Syntactic analysis
3. Semantic analysis
4. Intermediate code generation
5. Code optimization
6. Final code generation During lexical analysis, the source code of the computer program is scanned and components or tokens of the high-level language are identified. The compiler converts the source code into a series of tokens that are processed during syntactic analysis. For example, during lexical analysis, the compiler would identify the statement cTable=1.0;

as the variable (cTable), the operator (=), the constant (1.0), and a semicolon. A variable, operator, constant, and semicolon are tokens of the high-level language.

During syntactic analysis (also referred to as "parsing"), the compiler processes the tokens and generates a syntax tree to represent the program based on the syntax (also referred to as "grammar") of the programming language. A syntax tree is a tree structure in which operators are represented by non-leaf nodes and their operands are represented by child nodes. In the above example, the operator ("=") has two operands: the variable (cTable) and the constant (1.0). The term "parse tree" and "syntax tree" are used interchangeably in this description to refer to the syntax-based tree generated as a result of syntactic analysis. For example, such a tree may optionally describe the derivation of the syntactic structure of the computer program (e.g., may describe that a certain token is an identifier, which is an expression as defined by the syntax). Syntax-based trees may also be referred to as "concrete syntax trees," when the derivation of the syntactic structure is included, and as "abstract syntax trees," when the derivation is not included.

During semantic analysis, the compiler modifies the syntax tree to ensure semantic correctness. For example, if the variable (cTable) is an integer and the constant (1.0) is floating point, then during semantic analysis a floating point to integer conversion would be added to the syntax tree.

During intermediate code generation, code optimization, and final code generation, the compiler generates machine instructions to implement the program represented by the syntax tree. A computer can then execute the machine instructions.

A system has been described for generating and maintaining a computer program represented as an intentional program tree, which is a type of syntax tree. (For example, U.S. Pat. No. 5,790,863 entitled "Method and System for Generating and Displaying a Computer Program" and U.S. Pat. No. 6,097,888 entitled "Method and System for Reducing an Intentional Program Tree Represented by High-Level Computational Constructs," which are hereby incorporated by reference.) The system provides a mechanism for directly manipulating nodes corresponding to syntactic elements by adding, deleting, and moving the nodes within an intentional program tree. An intentional program tree is one type of "program tree." A "program tree" is a tree representation of a computer program that includes operator nodes and operand nodes. A program tree may also include inter-node references (i.e., graph structures linking nodes in the tree), such as a reference from a declaration node of an identifier to the node that defines that identifier's type. An abstract syntax tree and a concrete syntax tree are examples of a program tree. Once a program tree is generated, the system performs the steps of semantic analysis, intermediate code generation, code optimization, and final code generation to effect the transformation of the computer program represented by the program tree into executable code.

That system also provides editing facilities. The programmer can issue commands for selecting a portion of a program tree, for placing an insertion point in the program tree, and for selecting a type of node to insert at the insertion point. The system allows various commands to be performed relative to the currently selected portion and the current insertion point. For example, the currently selected portion can be copied or cut to a clipboard. The contents of the clipboard can then be pasted from the clipboard to the current insertion point using a paste command. Also, the system provides various commands (e.g., "Paste=") to insert a new node (e.g., representing an assignment operator) at the current insertion point.

The system displays the program tree to a programmer by generating a display representation of the program tree. A display representation format specifies the visual representation (e.g., textual) of each type of node that may be inserted in a program tree. The system may support display representation formats for several popular programming languages, such as C, Java, Basic, and Lisp. This permits a programmer to select, and change at any time, the display representation format that the system uses to produce a display representation of a program tree. For example, one programmer can select to view a particular program tree in a C display representation format, and another programmer can select to view the same program tree in a Lisp display representation format. Also, one programmer can switch between a C display representation format and a Lisp display representation format for a program tree.

The system also indicates the currently selected portion of the program tree to a programmer by highlighting the corresponding display representation of the program tree. Similarly, the system indicates the current insertion point to a programmer by displaying an insertion point mark (e.g., "|" or "^") within the displayed representation. The system also allows the programmer to select a new current portion or re-position the insertion point based on the display representation.

The editing facilities of the system allow insertion of new nodes typically only relative to sibling nodes. For example, a node can be added before or after a selected sibling node. The first child node cannot be added this way, since there are no siblings to select. As a result, the system may automatically add a child node whenever a non-leaf parent node is added to the program tree. For example, when a binary operator node is added to the program tree, the system adds at least one child node as an operand. The type of the child node is "to be determined" because the system did not know the type of operand that the programmer wanted. The system then allows the programmer to change the type of the node. Although the automatic adding of a child node allowed for a child node to be added without any sibling nodes, some programmers would have preferred to have a way to add child nodes without using nodes with a "to be determined" type.

Figure 1:
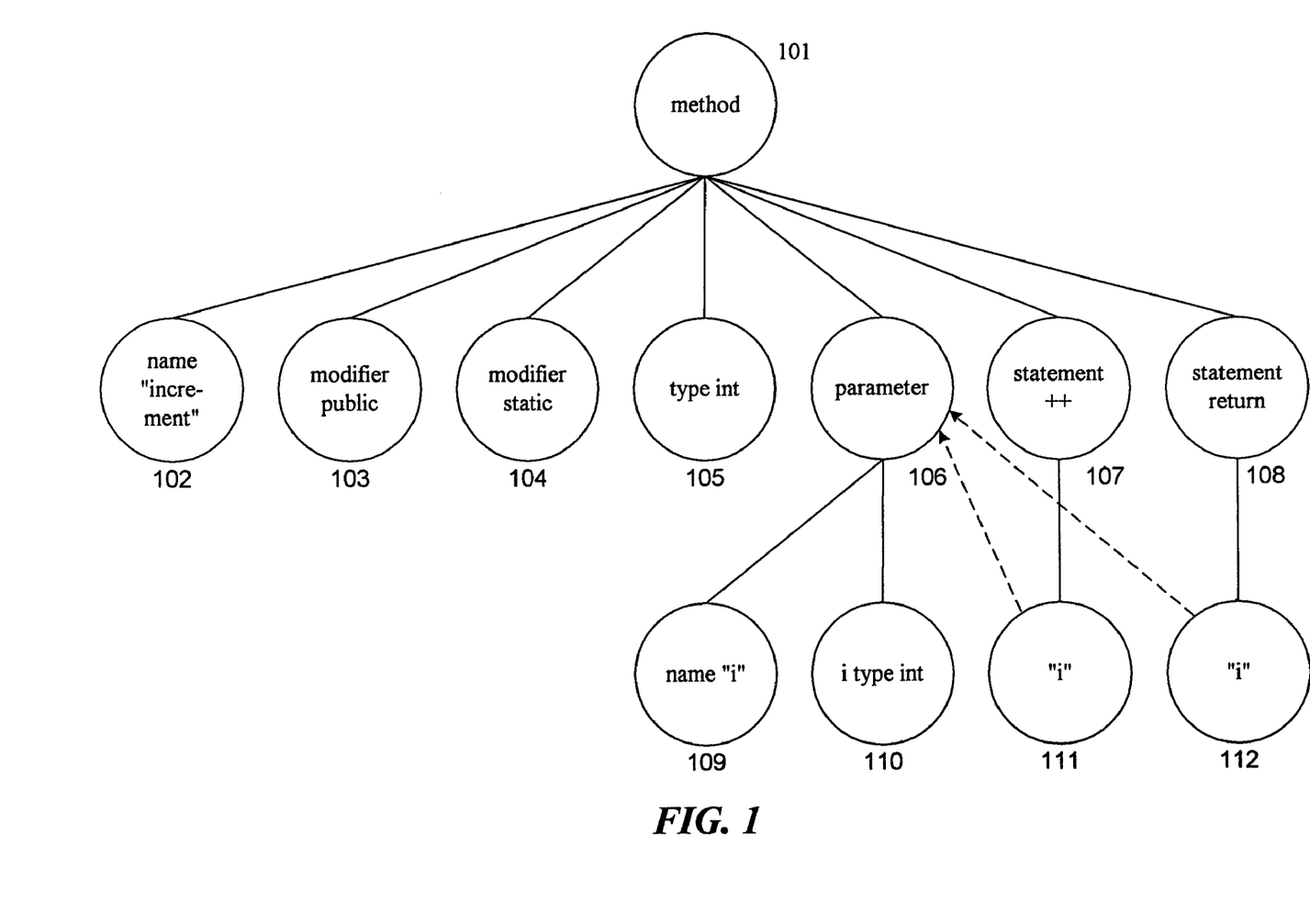
FIG. 1 is a diagram illustrating a portion of a program tree corresponding to definition of a method.

FIG. 1 is a diagram illustrating a portion of a program tree corresponding to the definition of a method. The method is defined by the following:

public static int increment (int i){i++; return i;}

Node 101 corresponds to the root of the sub-tree of the program tree representing the "increment" method. Nodes 102-108 are child nodes of the root node. Nodes 109 and 110 are child nodes of node 106, node 111 is a child node of node 107, and node 112 is a child node of node 108. Each node has a reference to another node in the program tree that defines the node type. For example, node 107 references (e.g., "statement") a declaration node that defines a statement, and node 111 references (e.g., indicated by the dashed line) node 106 for the parameter "i." Such referenced nodes are also referred to as declaration definitions.

A node of a certain node type may have a variable number of child nodes. For example, the "increment" method has seven child nodes. The references to child nodes may be stored in an array of references of the parent node. For example, entry 1 of the array may reference the child node of type "name," entries 2 and 3 may reference the child nodes of type "modifier," and so on. To identify the child nodes of a parent node with a certain node type, the system, however, would typically need to access each child node of the parent node. It would be desirable if the types of child nodes could be identified without having to access each child node.

The system also needed to track various groupings of node types. For example, the formal parameters of a method may have node types of input parameter, output parameter, or input/output parameter. The system needed to be programmed with knowledge that these three different node types were formal parameters. Thus, whenever the system needed to identify the child nodes representing the formal parameters, it would check each child node of the method node to see if the node type of the child node matched on these three node types. When the system is embedded with such knowledge, the system needed to be modified whenever such groupings changed, whenever new groupings were added, and whenever new node types were added to a group. It would be desirable to avoid such modifications to the system.

DETAILED DESCRIPTION

A method and system for organizing nodes within a program tree is provided. In one embodiment, the system allows various child node categories to be defined for node types of a program tree. For example, a "method" node type may have a modifiers category and parameters category defined for its child nodes. When a child node is added to a parent node, the system identifies the category of the child node. The system then instantiates a category data structure for the identified category. The system stores a reference to the instantiated category data structure in the parent node and stores a reference to the child node in the instantiated category data structure. For example, when a child node of a modifiers category is added to a method node, the system instantiates a modifiers category data structure, stores a reference to the modifiers category data structure in the method node, and stores a reference to the child node in the modifiers category data structure. When an additional child node of the identified category is added to the parent node, the system stores a reference to that child node in the instantiated category data structure. For example, when another child node of the modifiers category is added to the method node, the system stores a reference to the child node in the modifiers category data structure. A category in one embodiment may represent nodes of different node types. For example, the category of parameters may represent node types of input parameter, output parameter, and so on. As a result of the organizing of child nodes by categories, all child nodes of the identified category can quickly be located by accessing the instantiated category data structure for that category without having to access each child node. In addition, the level of indirection provided by the category data structures means that new categories of child nodes can be added to or deleted without affecting the locating of child nodes within other categories.

The system also allows child nodes to be added to a parent node that currently has no child nodes. The system allows the parent node to be "under selected," by a programmer, which means that a point beneath the parent node is selected. If the programmer then indicates to insert a node at the selected point, the system inserts a node as a child node of the "under selected" node. In one embodiment, before the child node is added, the system prompts the programmer to enter the category of the child node. The system may display a list of categories that are appropriate for the child nodes of the "under selected" node. The programmer then can select one of the categories. The system then instantiates the appropriate category data structure and adds a reference to that child node to that category data structure. The system may alternatively prompt the programmer to input the node type of the child node, rather than its category. In such a case, the system may then determine the category based on a mapping of node types to categories.

One skilled in the art will appreciate that under selecting can also be used to insert child nodes for other than the first child node of a parent mode. The system may be provided with a mapping of node types to categories. This mapping is also referred to as a "schema." The mapping may map each node type to the possible node types of its child nodes. The mapping may also map each node type to its category. For example, the method node type may be mapped to a modifiers node type, a input parameter node type, and so on. The input parameter node type may be mapped to the parameters category. When a child node is to be inserted, the system uses the mappings to display a list of node types associated with the selected node. When the programmer enters the node type, the system determines its category from the mapping. In this way, the system can be developed without knowledge of specific mappings of node types to categories and the mappings can be customized to the programming environment.

Figure 2A:
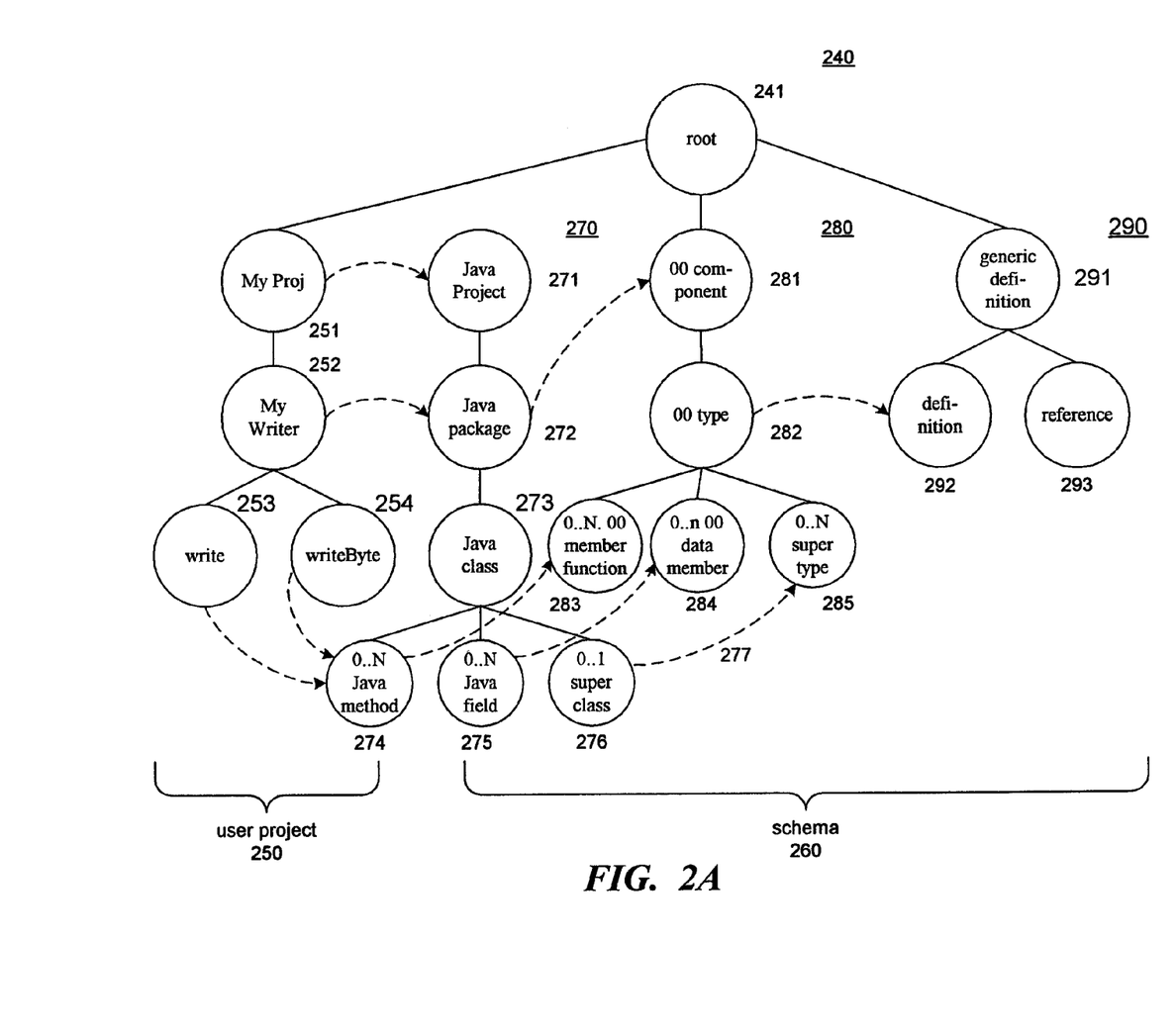
FIG. 2A is a diagram illustrating a portion of a program tree that shows a sample user project and sample schemas in one embodiment.

FIG. 2A is a diagram illustrating a portion of a program tree that shows a sample user project and sample schemas in one embodiment. Program tree 240 includes a user project subtree 250 and schema subtrees 260. The schema subtrees include subtrees 270, 280, and 290, which may be a standard part of each program tree that represents a Java computer program. The root of the program tree is represented by node 241. The user project subtree 250 includes nodes 251-254 that represent a portion of the following code:

```
class MyWriter {
    void write(byte i) {
        writeByte(i);
    }
    void writeByte( ) { ... }
    ...
}
```

Schema subtree 290 specifies the structure of a valid program tree that may be common to any programming language. Schema subtree 280 specifies the structure of a valid program tree that may be common to any object-oriented programming language. Schema subtree 270 specifies the structure of a valid program tree for the Java programming language. For example, nodes 282 specifies that a program tree representing a computer program in an object-oriented programming language can have a node that is a node type of "OO type." In addition, nodes 283, 284, and 285 indicate that a node with a node type of "OO type" can have child nodes with node types of "OO member function," "OO data member," and "OO supertype," respectively. Each child node may also specify the number of occurrence of a node of that node type that is allowed in a valid program tree. For example, "0 . . . N" means that there may be zero or more occurrences, "0 . . . 1" means that there may be zero or one occurrence, "1" means that there must be only one occurrence, and so on. The child nodes in one embodiment may represent the possible categories of a node of the parent node type. For example, a node of node type "Java class" in a program tree can have child nodes with the categories of "Java method," "Java field," or "superclass" as indicated by nodes 274, 275, and 276. Each node of a program tree may have its node type defined by a reference to a node within a schema. For example, user program nodes 252, 253, and 254 reference schema nodes 272, 274, and 274, respectively. Each schema represents a certain level of abstraction defining a valid computer program. In this example, schema subtree 290 represents an abstraction of schema subtree 280, which represents an abstraction of schema subtree 270. Each node of a schema subtree may have a reference to the corresponding node in the next higher level of abstraction. For example, node 276 corresponding a "superclass" node type for the Java programming language has a reference to node 285 corresponding to the "supertype" node type for an object-oriented programming language as indicated by the dashed line 277. Each node may represent a structure containing information (e.g., documentation) relating to the node type of the node. The references between nodes represented by the dashed lines are referred to as "is a" relationships. Each is a relationship may be considered to extend the structure of the referenced node. For example, node 276 with a node type of "superclass" as an is a relationship with node 285 with a node type of "supertype." Node 285 may have documentation that describes the "supertype" node type generically, while node 276 may have document that describes the Java "superclass" node type specifically, which effectively extends the documentation of node 276.

Figure 2B:
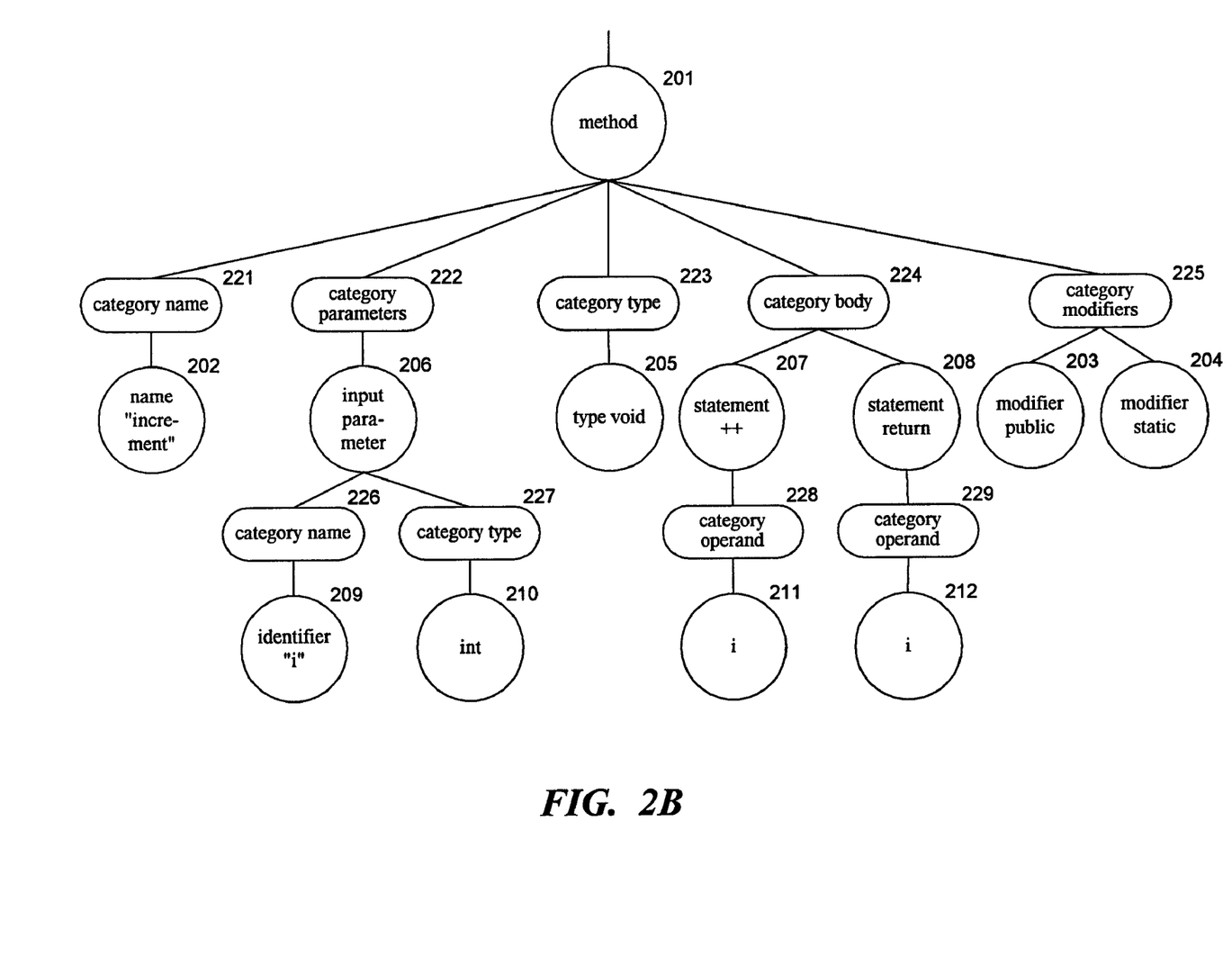
FIG. 2B is a diagram illustrating a portion of a program tree corresponding to the definition of a method in which child nodes are organized by categories.

FIG. 2B is a diagram illustrating a portion of a program tree corresponding to the definition of a method in which child nodes are organized by categories. The method is defined by the following:

public static int increment (inti) {i++; return i;}

The "increment" method corresponds to the method of FIG. 1. Circles 201-212 represent nodes of the program tree, and oblong shapes 221-229 correspond to the category data structures. Oblong shape 225 represents an instance of the category data structure for the modifiers category. The modifiers category data structure organizes the public and static modifiers of the method represented by nodes 203-204. The parameters of the method are organized by the parameters category data structure 222. In this example, since only one parameter is defined, the parameters category data structure contains only one reference to an input parameter node, node 206. The child nodes 209-210 of node 206 are also organized by their categories. One skilled in the art will appreciate that the categorization of child nodes can be performed at any level within a program tree. The method node 201 may contain a mapping between category names and references to the category data structures. For example, the method node 201 may contain a mapping from the category "parameters" to the parameters category data structure 222. As a result, the category data structures for child nodes of a parent node are order independent. In a similar manner, the child nodes within a category data structure can be organized by a name associated with the child. For example, the parameters category data structure 222 may have a mapping between the parameter name (e.g., "int") and a reference to the child node (e.g., node 206). One skilled in the art will appreciate that the information provided by the category data structures can be provided in many different ways. For example, the information could be stored directly in parent nodes. Alternatively, the information of multiple category data structures can be stored using a hash table. With such an alternative, each node may have a unique node identifier that is used to retrieve information from the hash table that specifies the categories of its child nodes.

Figure 3:
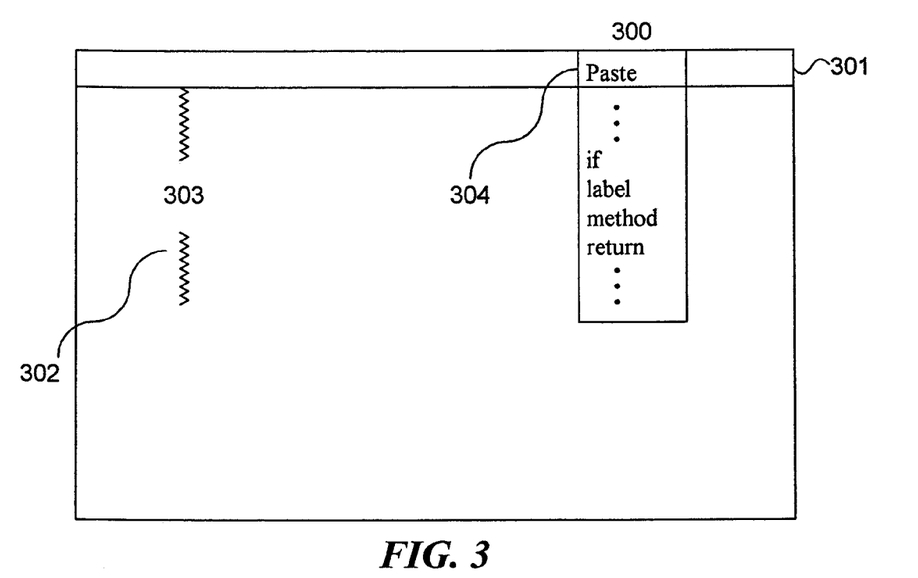
FIG. 3 is a diagram illustrating the insertion into a program tree of a new node as a child node of the selected node.
Figure 4:
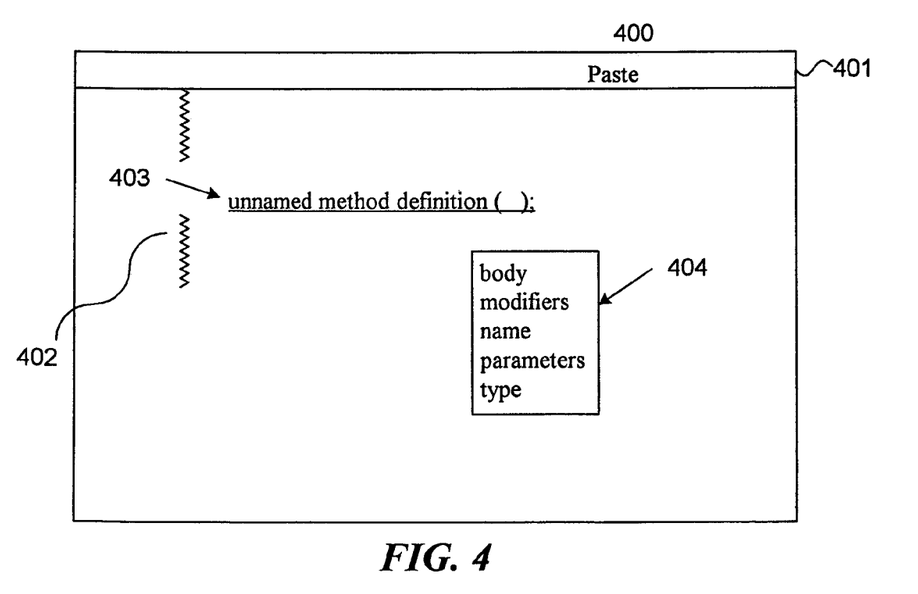
FIG. 4 is a diagram of a display page that illustrates the program tree after a method node has been inserted.

FIGS. 3-8 are diagrams of display pages that illustrate the inserting of a child node using under selection and categories in one embodiment. FIG. 3 is a diagram illustrating the insertion into a program tree of a new node as a child node of the selected node. Display page 300 includes a menu area 301 and a display area 302. The arrow 303 indicates the currently selected position within the program. When the programmer selects the paste menu item, a list of node types of nodes that can be inserted into the program tree at the currently selected position is displayed. The system identifies the possible node types from the schema. The programmer then selects the node type for the node to be inserted into the program tree. In this example, the programmer selects the method node type. The system may then determine the category for the method node type based on the node type of the parent node. In this example, the node type of the parent may be "module." The mapping between node types and categories may specify that the method node type is within the statement category within the module node type. The system may instantiate the statement category data structure for the module node if not already instantiated. The method definition node is not yet valid within the program since it does not yet have a name or a body. In one embodiment, the system stores the insertion of the node as a pending change to the program, rather than changing the program itself. The processing of pending changes is described in U.S. patent application Ser. No. 10/435,497, filed May 9, 2003 (now U.S. Pat. No. 7,237,226), entitled "Method and System for Storing Pending Changes to Data," which is hereby incorporated by reference. The system may, however, display an indication of pending changes at their insertion points as illustrated by FIG. 4.

Figure 5:
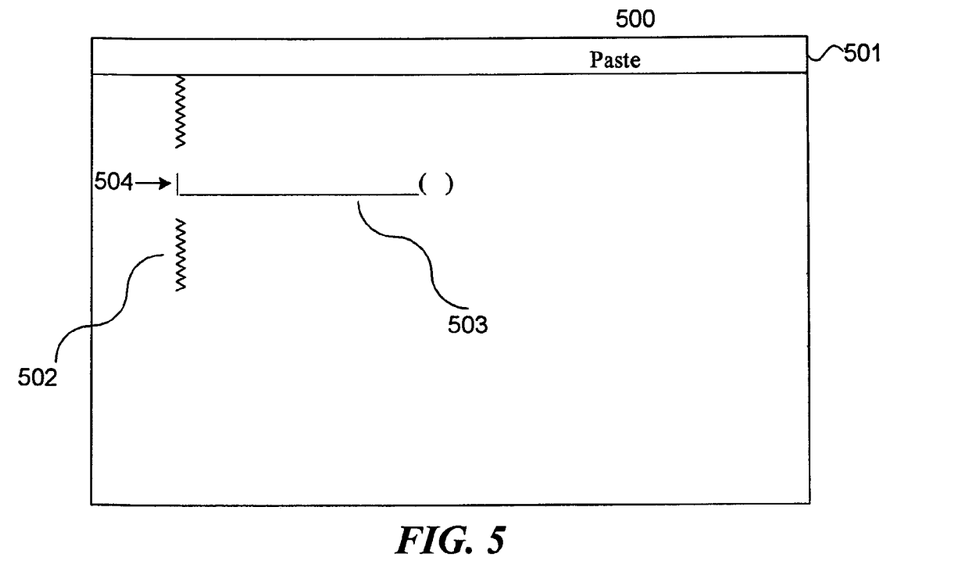
FIG. 5 is a diagram of a display page after the name category has been selected.
Figure 6:
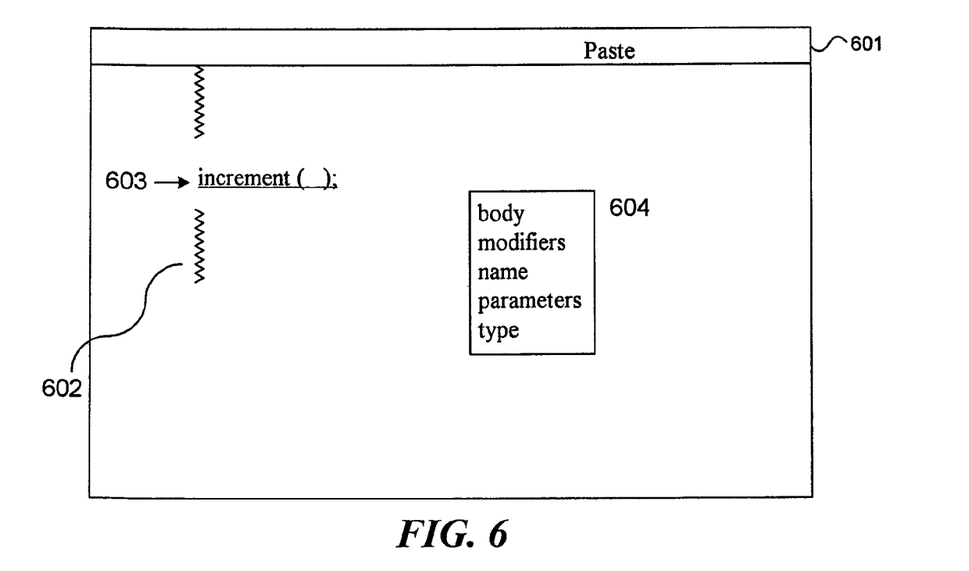
FIG. 6 is a diagram of a display page that illustrates the program tree after the method has been named.
Figure 7:
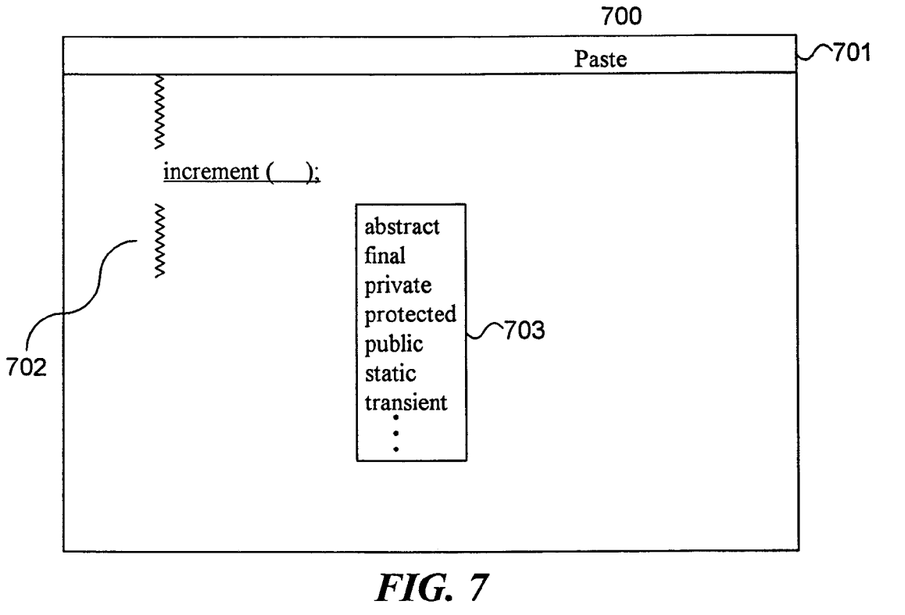
FIG. 7 is a diagram of a display page after selection of the type category.
Figure 8:
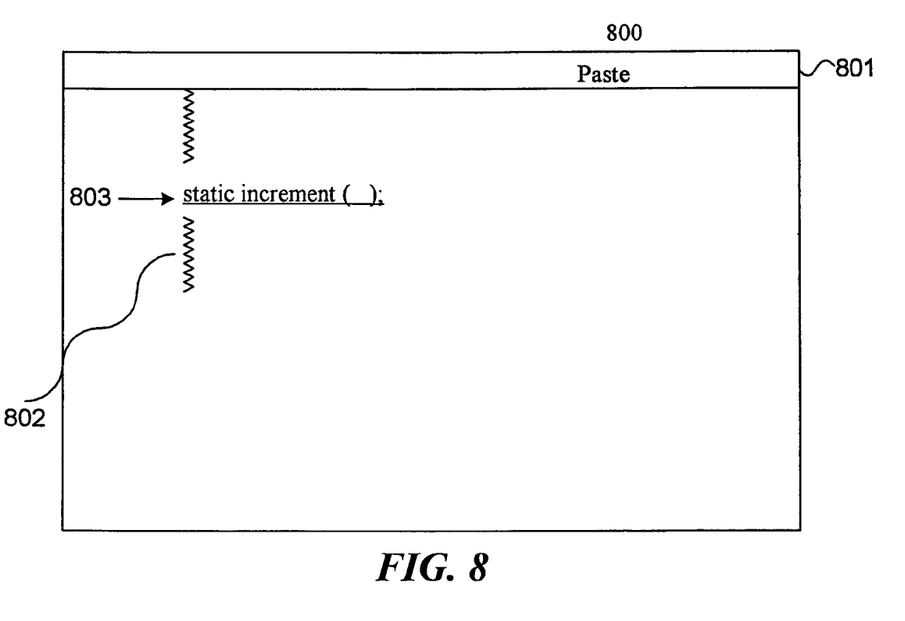
FIG. 8 is a diagram of a display page that illustrates the program tree after the type of the method has been specified.

FIG. 4 is a diagram of a display page that illustrates the program tree after a method node has been inserted. Display page 400 includes a menu area 401 and a display area 402. The display area includes an unnamed method definition 403 corresponding to the node just inserted. The programmer then performed an under selection of the unnamed method definition and then selected a menu item to insert a node. The system then displayed a list 404 of categories (or alternatively child node types) for a method node. FIG. 5 is a diagram of a display page after the name category has been selected. Display page 500 includes a menu area 501 and a display area 502. The system has displayed input area 503 with insertion point 504 to prompt the user to enter the name of the method. FIG. 6 is a diagram of a display page that illustrates the program tree after the method has been named. In the example, the user entered the name as "increment." Display page 600 includes a menu area 601 and display area 602. The method node 603 is shown with its name. The programmer performed an under selection of the increment method and then selected a menu item to insert a node. The system then displayed a list 604 of categories for the child nodes of the method node. FIG. 7 is a diagram of a display page after selection of the modifier category. Display page 700 includes a menu area 701 and a display area 702. The system has displayed a list 703 of modifiers for a method definition so that the programmer can select the modifier to be added. FIG. 8 is a diagram of a display page that illustrates the program tree after a modifier of the method has been specified. In this example, the user has selected the static modifier. Display page 800 includes a menu area 801 and a display area 802. The display area includes the method statement 803 that has its name and modifiers categories defined.

Figure 9:
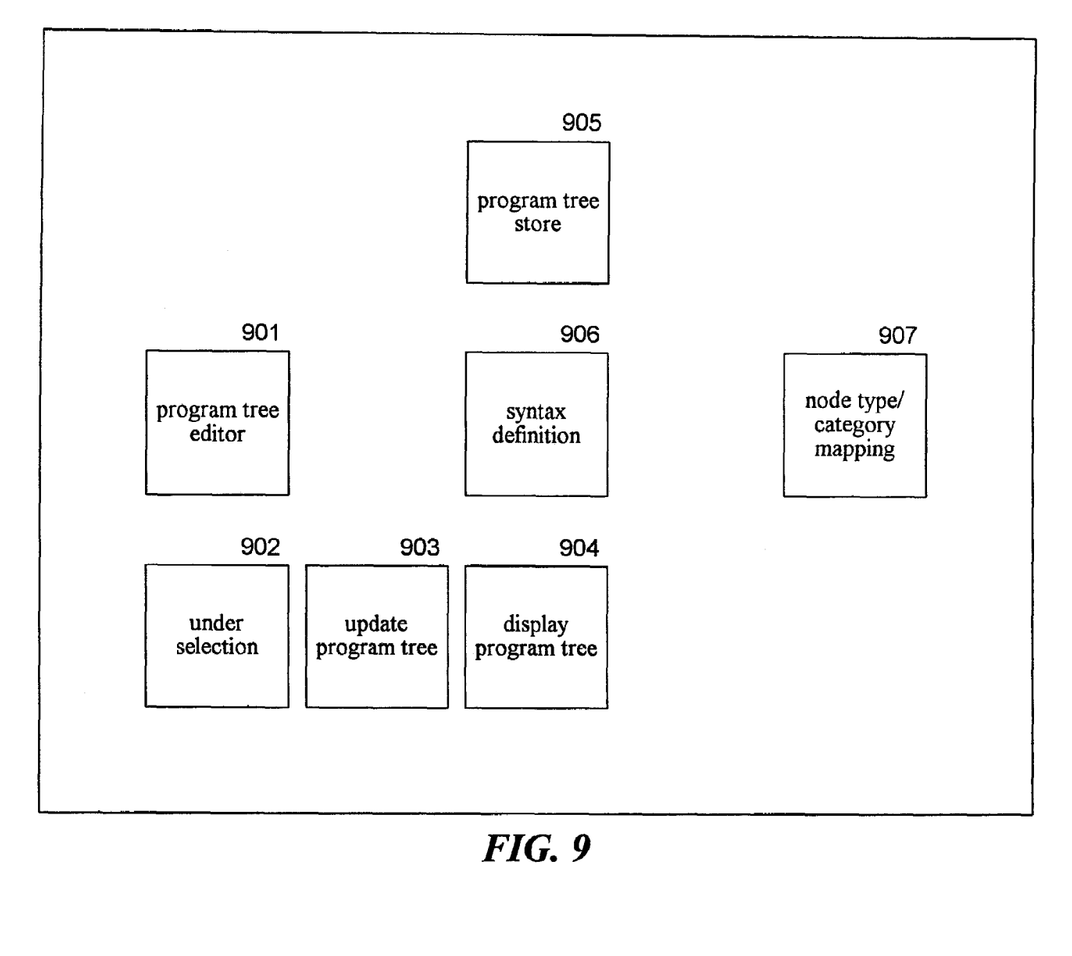
FIG. 9 is a block diagram illustrating components of the editing system in one embodiment.

FIG. 9 is a block diagram illustrating components of the editing system in one embodiment. The editing system includes a program tree editor 901, an under selection component 902, an update program tree component 903, and a display program tree component 904. The program tree editor invokes the under selection component to coordinate the under selection of a node as indicated by a programmer. The program tree editor invokes the update program tree component when the programmer has indicated to make a modification (e.g., add a node) to the program tree. The program tree editor invokes the display program tree component to update the display of the program tree. The editing system also includes a program tree store 905, a syntax definition 906, and node type/category mapping 907. The program tree store contains the program tree currently being modified by the program tree editor. The syntax definition defines the syntax for the program tree currently being edited. For example, the syntax definition may represent the syntax of the C# programming language. The node type/category mapping contains the mappings between node types and categories. In one embodiment, the mappings may be stored using an XML schema definition ("XSD"). The mappings may also be stored within the declaration definition nodes of the program tree. For example, a declaration definition node for a method node type may contain a list of the body, modifiers, name, parameters, and type categories. One skilled in the art will appreciate that the mappings may be logically organized in many different ways. For example, each node type can be mapped to the categories of its child nodes and each category can be mapped to the node types within that category. As another example, each node type can be mapped to its child node types, and each node type can be mapped to its category.

The system may be implemented on a computer system that include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communications link. Various communications links may be used, such as the Internet, a local area network, a wide area network, or a point-to-point dial-up connection.

Figure 10:
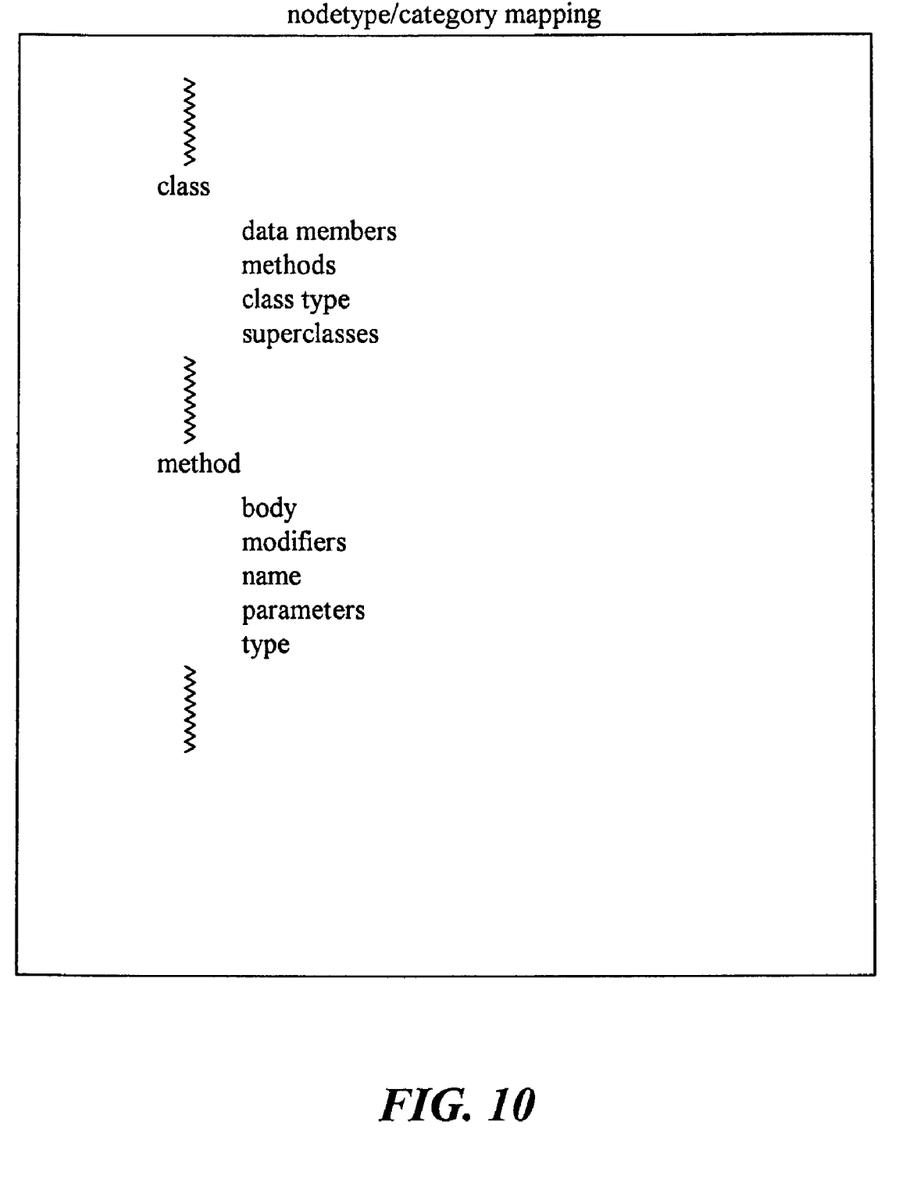
FIG. 10 is a diagram illustrating a node type/category mapping in one embodiment.

FIG. 10 is a diagram illustrating a node type/category mapping in one embodiment. This mapping is an alternative mapping to that specified by a schema. In this example, the node type of class and method are defined. The class node type is defined as having the categories of data members, methods, class type, and superclasses. The method node type is defined as having the categories of body, modifiers, name, parameters, and type. Each category may be mapped to node types within that category. For example, the modifiers category may be mapped to node types of static and public. When a programmer selects to add a child node, the system identifies the node type of the parent node and retrieves the category mappings for that node type. The system then displays a list of categories so that the programmer can select the category appropriate to the child node being added.

Figure 11:
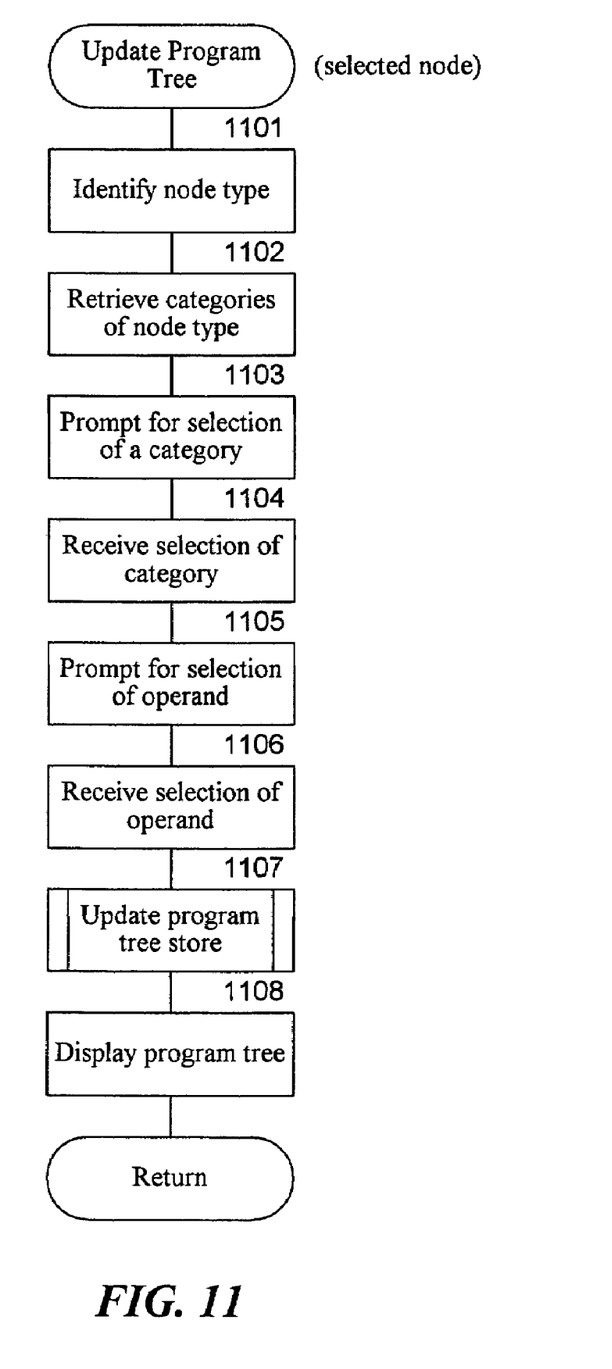
FIG. 11 is a flow diagram illustrating the processing of the update program tree component when the update is to insert a node based on an under selection in one embodiment.

FIG. 11 is a flow diagram illustrating the processing of the update program tree component when the update is to insert a node based on an under selection in one embodiment. The component is passed an indication of the node that is under selected. In block 1101, the component identifies the node type of the under selected node. In block 1102, the component retrieves the categories for the identified node type from the node type/category mapping, which may be defined in a schema. In block 1103, the component prompts the programmer for selection of a category by displaying a list of the categories. In block 1104, the component receives a selection of a category by the programmer. In block 1105, the component prompts the programmer for selection of child node information (e.g., static or public for the modifiers category). In block 1106, the component receives the selection of the child node information. In block 1107, the component invokes the update program tree store to update the program tree store to reflect the insertion of the child node with the selected category and child node information. In block 1108, the component displays the updated program tree and then completes.

Figure 12:
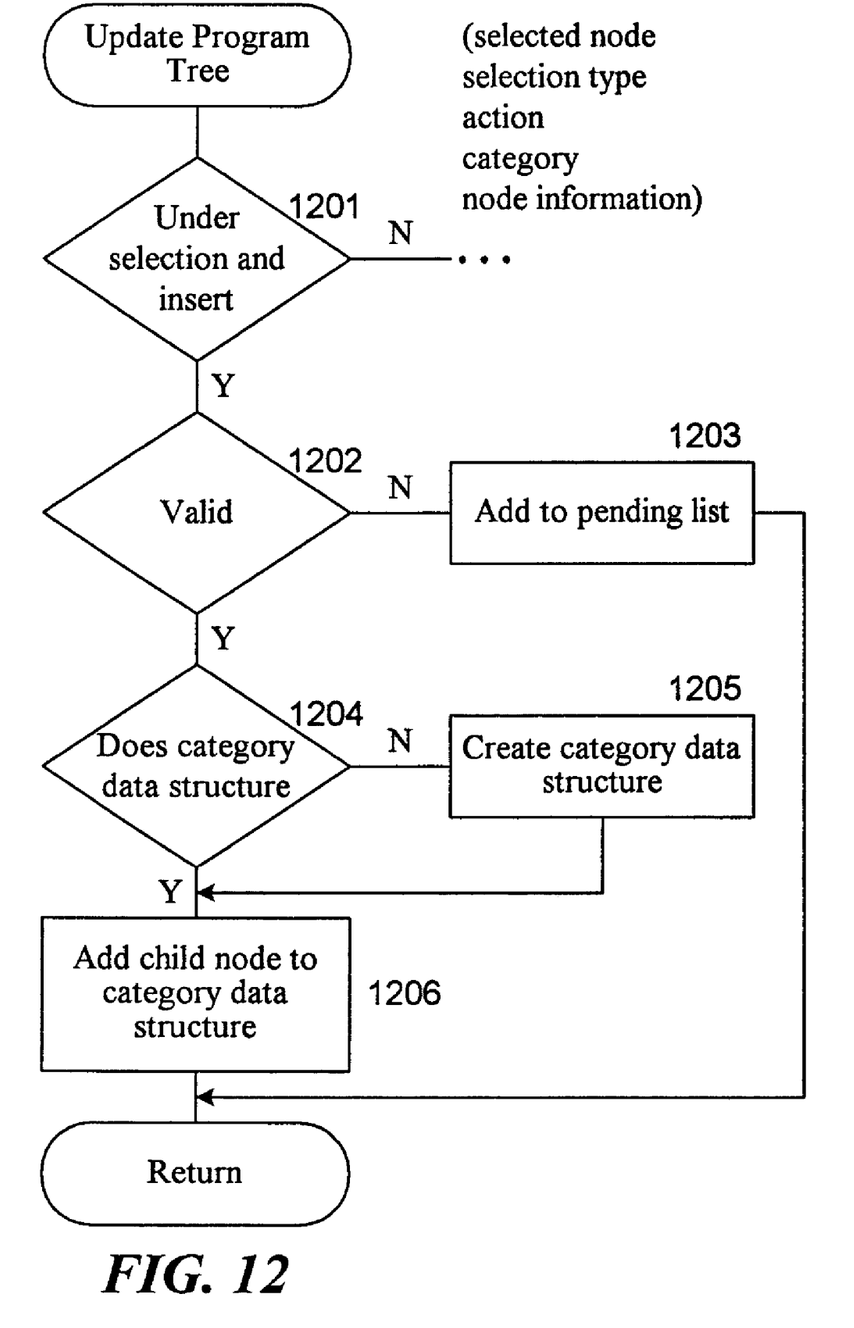
FIG. 12 is a flow diagram illustrating the processing of the update program tree store in one embodiment.

FIG. 12 is a flow diagram illustrating the processing of the update program tree store in one embodiment. The component controls the updating of the program tree store. The component is passed an indication of the selected node, the type of selection, and information describing the update to the program tree. The illustrated processing is performed when the selection is an under selection and the action is to insert a node of a specified category with the specified node information. In decision block 1204, if the selection is under selection and the action is to insert a node, then the component continues at block 1202, else the component continues to process other types of selections and actions. In decision block 1202, if the insertion would be syntactically correct, then the component continues at block 1204, else the component continues at block 1203. In block 1203, the component adds a description of the insertion to a pending list of changes to the program tree and then returns. In decision block 1201, if an instance of the category data structure for the specified category already exists for the selected node, then the component continues at block 1206, else the component continues at block 1205. In block 1205, the component creates an instance of the category data structure for the specified category. The component also adds to the selected node a reference to the instance. In block 1206, the component creates the child node and adds a reference to the child node to the instance of the category data structure and then completes.

One skilled in the art will appreciate that although specific embodiments of the editing system have been described herein for purposes of illustration, various modifications may be made without deviating from the spirit and scope of the invention. Accordingly, the invention is defined by the appended claims.

I claim:

1. A method in a computer system having a processor and a memory for generating a program tree representing a program, the method comprising:
   providing a parent node for the program tree;
   providing child nodes of the parent node, each child node having a category, each category having an associated category data structure, wherein the parent node and the child nodes are not category data structures;
   for each of a plurality of categories, adding to the parent node a reference to the category data structure for that category; and
   for each child node, adding to the category data structure for the category of the child node a reference to the child node, wherein the category data structure does not contain references to other category data structures,
   whereby the category of any child node is identified without accessing the child nodes, and
   wherein the providing and adding are performed by the processor executing instructions stored in the memory.

2. The method of claim 1 wherein associating with the parent node a reference to that category includes creating a category data structure for that category for the parent node.

3. The method of claim 1 including:
   receiving an indication to add a child node to the program tree;
   providing an indication of categories; and
   receiving a selection of one of the indicated categories as the category of the child node being added.

4. The method of claim 3 wherein the receiving of the indication to add a child node to the program tree includes receiving from a user a selection of the parent node and receiving from the user an indication to add a child node to the selected parent node.

5. The method of claim 4 wherein receiving from the user a selection of a parent node occurs when the parent node currently has no child nodes.

6. The method of claim 3 wherein the receiving of the indication to add a child node to the program tree includes receiving from a user a selection of a current child node and receiving from the user an indication to add a sibling node of the current child node.

7. The method of claim 6 wherein the selected current child node and to-be-added child node have the same category.

8. The method of claim 1 wherein each node of the program tree has a node type and each node type has a list of categories associated with nodes of that node type.

9. The method of claim 8 wherein the categories for each node type are specified in a schema for the program tree.

10. The method of claim 1 wherein the parent node, child nodes, and category data structures are each stored separately.

11. A method in a computer system having a processor and a memory of modifying a program tree representing a program, the method comprising:
    displaying a representation of nodes of the program tree;
    receiving from a user a selection of a node of the program tree from the displayed representation, the selection indicating to add to the program tree a child node of the selected node;
    receiving from the user an indication of a category of the child node;
    adding to a category data structure associated with the category of the child node a reference to the child node;
    adding a node to the program tree as a child node of the selected node; and
    adding to the selected node a reference to the category data structure associated with the category of the child node, wherein the selected node is not a category data structure,
    wherein the selected node stores a reference to the category data structures associated with each of its child nodes and wherein the child nodes of the selected node are accessed by their categories, and
    wherein the displaying, receiving, and adding are performed by a processor executing instructions stored in the memory.

12. The method of claim 11 wherein the selection of the node is an under selection of the node.

13. The method of claim 11 wherein the selected node has no child nodes when selected.

14. The method of claim 11 wherein the selected node has child nodes when selected.

15. The method of claim 11 wherein the selected node, child nodes, and category data structures are each stored separately.

16. A computer system for generating a program tree representing a program, comprising:
    a processor;
    means for storing within a parent node references to each category data structure associated with categories of child nodes of the parent node, wherein the parent node is not a category data structure; and
    means for storing within each category data structure a reference to a plurality of child nodes of the parent node, each child node being associated with the category associated with that category data structure, whereby the child nodes of the parent node are organized according to their categories and wherein the parent node does not contain references to the child nodes, so that the child nodes associated with a category are identified without traversing each child node or references to child nodes associated with another category.

17. The system of claim 16 wherein the means for associating with the parent node references to categories includes creating a category data structure for that category for the parent node.

18. The system of claim 16 including:
means for receiving an indication to add a child node to the program tree;
means for providing an indication of categories; and
means for receiving a selection of one of the indicated categories as the category of the child node being added.

19. The system of claim 18 wherein the means for receiving of the indication to add a child node to the program tree includes means for receiving from a user a selection of the parent node and receiving from the user an indication to add a child node to the selected parent node.

20. The system of claim 19 wherein the means for receiving from the user a selection of the parent node occurs when the parent node currently has no child nodes.

21. The system of claim 18 wherein the means for receiving of the indication to add a child node to the program tree includes means for receiving from a user a selection of a current child node and receiving from the user an indication to add a sibling node of the current child node.

22. The system of claim 16 wherein each node of the program tree has a node type and each node type has a list of categories associated with nodes of that node type.

23. The system of claim 22 wherein the categories for each node type are specified in a schema for the program tree.

24. The computer system of claim 16 wherein the parent node, child nodes, and category data structures are each stored separately.

25. A computer-readable storage medium storing instructions for controlling a computer system to modify a program tree representing a program, by a method comprising:
displaying a representation of nodes of the program tree;
receiving from a user a selection of a node of the program tree from the displayed representation, the selection indicating to add to the program tree a child node of the selected node;
receiving from the user an indication of a category of the child node;
adding to a category data structure associated with the category of the child node a reference to the child node;
adding a node to the program tree as a child node of the selected node; and
adding to the selected node a reference to the category data structure associated with the category of the child node, wherein the selected node is not a category data structure,
wherein the selected node stores a reference to the category data structures associated with each of its child nodes and wherein the child nodes of the selected node are accessed by their categories.

26. The computer-readable storage medium of claim 25 wherein the selection of the node is an under selection of the node.

27. The computer-readable storage medium of claim 25 wherein the selected node has no child nodes when selected.

28. The computer-readable storage medium of claim 25 wherein the selected node has child nodes when selected.

29. The computer-readable storage medium of claim 25 including after receiving the selection of a node, displaying an indication of possible categories of child nodes.

30. The computer-readable storage medium of claim 25 wherein a parent node has a node type and the categories for child nodes for nodes of that node type are stored in a schema.

31. The computer-readable storage medium of claim 30 wherein the schema is part of the program tree.

32. The computer-readable storage medium of claim 25 wherein the selected node, child nodes, and category data structures are each stored separately.

* * * * *

UNITED STATES PATENT AND TRADEMARK OFFICE
CERTIFICATE OF CORRECTION

PATENT NO.         : 7,730,102 B2                                                Page 1 of 1
APPLICATION NO.    : 11/567690
DATED              : June 1, 2010
INVENTOR(S)        : Charles Simonyi It is certified that error appears in the above-identified patent and that said Letters Patent is hereby corrected as shown below:

In column 6, line 15, delete ""is a"" and insert -- "isa" --, therefor.

In column 6, line 16, delete "is a" and insert -- isa --, therefor.

In column 6, line 18, delete "is a" and insert -- isa --, therefor.

Signed and Sealed this

Fourteenth Day of September, 2010

David J. Kappos
*Director of the United States Patent and Trademark Office*